(12) United States Patent
Ishii et al.

(10) Patent No.: US 10,093,381 B2
(45) Date of Patent: Oct. 9, 2018

(54) COMPONENT MOUNTING STRUCTURE OF VEHICLE

(71) Applicant: KAWASAKI JUKOGYO KABUSHIKI KAISHA, Kobe-shi, Hyogo (JP)

(72) Inventors: Hiroshi Ishii, Kobe (JP); Daisuke Saeki, Kobe (JP); Tomo Yamamoto, Kobe (JP)

(73) Assignee: KAWASAKI JUKOGYO KABUSHIKI KAISHA, Kobe-shi, Hyogo (JP)

(*) Notice: Subject to any disclaimer, the term of this patent is extended or adjusted under 35 U.S.C. 154(b) by 431 days.

(21) Appl. No.: 14/822,642

(22) Filed: Aug. 10, 2015

(65) Prior Publication Data

US 2016/0046347 A1 Feb. 18, 2016

(30) Foreign Application Priority Data

Aug. 18, 2014 (JP) ................................. 2014-165787

(51) Int. Cl.
*B62K 19/24* (2006.01)
*F16B 2/04* (2006.01)
*B62K 11/04* (2006.01)

(52) U.S. Cl.
CPC .............. *B62K 19/24* (2013.01); *B62K 11/04* (2013.01); *F16B 2/04* (2013.01); *Y10T 403/7056* (2015.01); *Y10T 403/7069* (2015.01)

(58) Field of Classification Search
CPC ........ B62K 11/04; B62K 19/18; B62K 19/24; F16B 2/04; F16B 7/025; F16B 7/0453;

(Continued)

(56) References Cited

U.S. PATENT DOCUMENTS 3,945,743 A * 3/1976 Koch ...................... F16B 7/025
312/263
5,197,349 A * 3/1993 Herman ................. B62K 21/18
280/278

(Continued)

FOREIGN PATENT DOCUMENTS

DE 4337612 A1 * 5/1995 .............. F16B 7/025
DE 19701083 A1 * 7/1998 .............. F16B 7/025

(Continued)

OTHER PUBLICATIONS

Japan Patent Office, Office Action Issued in Japanese Application No. 2014-165787, dated Jan. 9, 2018, 11 pages. (Submitted with English Translation of Office Action).

*Primary Examiner* — Josh Skroupa
(74) *Attorney, Agent, or Firm* — Alleman Hall Creasman & Tuttle LLP

(57) ABSTRACT

A component mounting structure of a vehicle comprises a frame assembly having a recess which is recessed in a predetermined direction; an intermediate section accommodated in the recess and removably fastened to the frame assembly; and a mounting member used to mount a first adjacent component adjacent to the frame assembly to the frame assembly, and the mounting member includes a connection element connected to the intermediate section in an inner space of the recess and a support element which is continuous with the connection element and supports the first adjacent component in a state in which the connection element is exposed outside through an opening of the recess.

9 Claims, 9 Drawing Sheets

(58) Field of Classification Search
CPC ...... F16B 9/023; F16B 9/026; Y10T 403/368;
Y10T 403/4685; Y10T 403/7051; Y10T
403/7052; Y10T 403/7056; Y10T
403/7067; Y10T 403/7069; Y10T
403/7123
USPC ............ 403/184, 260, 367, 368, 370, 374.3,
403/374.4, 388
See application file for complete search history.

(56) References Cited

U.S. PATENT DOCUMENTS

| | | | | |
|---|---|---|---|---|
| 5,232,304 A | * | 8/1993 | Huang | .................... F16B 7/025 403/374.4 |
| 5,442,973 A | * | 8/1995 | Liao | ...................... B62K 21/18 280/279 |
| 5,476,020 A | * | 12/1995 | Garvey | ................. B62K 15/00 280/279 |
| 5,540,457 A | * | 7/1996 | Johnson | ................ B62K 21/06 280/279 |
| 5,556,218 A | * | 9/1996 | Homer | ................. E04B 1/5831 403/170 |
| 5,680,798 A | * | 10/1997 | Luen | ..................... B62K 21/18 280/279 |
| 6,203,239 B1 | * | 3/2001 | Mucciaccciaro | ....... F16B 7/025 256/65.03 |
| 6,712,544 B2 | * | 3/2004 | Kruger | .................. F16B 5/0233 403/370 |
| 6,969,211 B2 | * | 11/2005 | Altman | ................. E04B 1/5831 403/171 |
| 7,086,896 B2 | * | 8/2006 | Edwards | ................ H05K 7/142 439/573 |
| 7,455,471 B2 | * | 11/2008 | Gawehn | ................ F16B 5/025 16/2.1 |
| 7,645,087 B1 | * | 1/2010 | Lin | ........................ B62K 21/18 403/109.5 |
| 9,127,701 B2 | * | 9/2015 | Tung | ...................... F16B 2/065 |
| 2013/0154311 A1 | * | 6/2013 | Keisuke | ................ B62K 19/06 296/205 |
| 2014/0138506 A1 | * | 5/2014 | Dahl | ................... F16M 13/022 248/276.1 |

FOREIGN PATENT DOCUMENTS

| | | | | |
|---|---|---|---|---|
| DE | 102007014484 A1 | * | 1/2008 | ............ F16B 7/0453 |
| EP | 0603114 A1 | * | 6/1994 | ............. F16B 7/025 |
| FR | 55804 E | * | 9/1952 | ............. B62K 19/24 |
| FR | 1580440 A | * | 9/1969 | ........... B62D 33/044 |
| FR | 2672645 A1 | * | 8/1992 | ............. F16B 9/026 |
| GB | 2274698 A | * | 8/1994 | ............. F16B 7/025 |
| JP | S61189893 U | | 11/1986 | |
| JP | H05201376 A | | 8/1993 | |
| JP | H06025613 U | | 4/1994 | |
| JP | 2007131030 A | | 5/2007 | |
| JP | 2013129239 A | | 7/2013 | |

* cited by examiner

COMPONENT MOUNTING STRUCTURE OF VEHICLE

BACKGROUND OF THE INVENTION

Field of the Invention

The present invention relates to a component mounting structure of a vehicle.

Description of the Related Art

For example, a straddle-type vehicle disclosed in Japanese Laid-Open Patent Application Publication No. 2007-131030 includes a vehicle body frame extending in a forward and rearward direction in a vehicle body. The vehicle body flame includes a pair of right and left main frames extending in the forward and rearward direction in the vehicle body. An engine is supportedly mounted to the pair of right and left main frames. In some cases, external components such as a cowling or an engine slider for protecting the engine on a side are further mounted to the vehicle body frame of the straddle-type vehicle.

The external component is mounted to the frame member of a vehicle, such as the vehicle body frame of the straddle-type vehicle, by use of, for example, a bracket attached to the frame member. Or, the external component is mounted to the frame member by inserting a bolt into a bolt hole formed in the frame member and threadingly engaging the bolt with the bolt hole. If the external component can be mounted to the frame member without substantially changing the structure of the frame member, the vehicle can be designed more flexibly while lessening a limitation on the structure for mounting the external component to the frame member, which is an advantage.

SUMMARY OF THE INVENTION

An object of the present invention is, to provide a component mounting structure of a vehicle, which allows a vehicle body to be designed more flexibly.

According to an aspect of the present invention, a component mourning structure of a vehicle comprises a frame assembly having a recess which is recessed in a predetermined direction; an intermediate section accommodated in the recess and removably fastened to the frame assembly; and a mounting, member used to mount a first adjacent component adjacent to the frame assembly to the frame assembly, wherein the mounting member includes a connection element connected to the intermediate section in an inner space of the recess and a support element which is continuous with the connection element and supports the first adjacent component in a state in which the connection element is exposed outside through an opening of the recess.

In accordance with this the component mounting structure of the vehicle according to the above aspect, the intermediate section is accommodated in the recess formed in the frame assembly and recessed in the predetermined direction, and removably fastened to the recess, and the first adjacent component is supported by the mounting member connected to the intermediate section in such a manner that a portion of the mounting member is exposed outside through the opening of the recess. By use of the recess and the intermediate section so configured, a structural limitation on mounting the external component or the like to the frame assembly can be lessened. Since the first adjacent component is mounted to the frame assembly having the recess of a specified shape by use of the intermediate section fastened to inside of the recess, it is not necessary to provide a structure used to fasten the first adjacent component, on the frame assembly. For example, by use of the existing recess intended for another purpose, the first adjacent component can be fastened to the frame assembly. As a result, it becomes possible to realize a component mounting structure of a vehicle, which allows the vehicle body to be designed more flexibly.

The connection element may be connected to the intermediate section such that the connection element is threadingly engageable with the intermediate section and disengageable from the in section.

In this configuration, the intermediate section and the mounting member can be firmly coupled to each other, and the intermediate section and the mounting member can be easily removably mounted to each other.

The frame assembly may include two or more elongated sections and a coupling section for coupling outer peripheral portions of the elongated sections which are adjacent to each other, and the inner space of the recess may be an inner space of the coupling section.

In accordance with this configuration, since the coupling section for coupling the adjacent elongated sections to each other can be used as the support element for the first adjacent component, it is not necessary to form on the frame assembly a structure such as a bracket used to support the first adjacent component. Therefore, the structure of the frame assembly can be simplified.

The coupling section may be placed such that an axis of the coupling section extends in a direction perpendicular to a lengthwise direction of one of the elongated sections.

Since the coupling section is placed such that its axis extends in the direction perpendicular to the lengthwise direction of one of the elongated sections, deformation of the coupling section or damage to the coupling section can be prevented when an external force is applied to the coupling section at a side of the elongated section.

The recess may be formed with a bolt hole, and a second adjacent component adjacent to the frame assembly may be fastened to the frame assembly by use of a fastening member placed via the bolt hole.

In accordance with this configuration, since the fastening member accommodated in the recess can be used as the support element of the first adjacent component, it is not necessary to form on the frame assembly a structure such as a bracket used to support the first adjacent component. Therefore, the structure of the frame member can be simplified.

The recess may have a function other than a function for mounting the first adjacent component to the frame assembly.

Since the first adjacent component is mounted to the frame assembly by use of the recess having, a plurality of functions, the recess can be used for a plurality of purposes. Therefore, it is not necessary to form the recess for each of purposes, and hence the structure of the frame assembly can be simplified.

The intermediate section may be removably mounted to the frame assembly in such a manner that the intermediate section pressingly contacts an inner peripheral surface of the recess or is moved away from the inner peripheral surface of the recess.

Since the intermediate section is removably mounted to the frame assembly via the inner peripheral surface of the recess, it is not necessary to provide a fastening member used to fasten the intermediate section, inside of the recess. As a result, the structure of the recess can be simplified.

The intermediate section may include a restricting section which contacts an end surface at the opening of the recess to restrict a displacement of the intermediate section in the predetermined direction.

By use of the above restricting section, the intermediate section can be easily positioned with respect to the recess. In addition, since it becomes possible to restrict the displacement of the intermediate section in the predetermined direction from the location restricted by the restricting section, an operator can easily carry out the operation for fastening the intermediate section to the frame assembly.

The connection element may have a threaded portion placed in the recess, the intermediate section may include a fastening element which pressingly contacts an inner peripheral surface of the recess and a threading element threadingly engaged with the threaded portion, and the fastening element may be retained between the support element and the threading element, and pressingly contact the inner peripheral surface of the recess as a threading engagement between the threaded portion and the threading element progresses.

Since the intermediate section pressingly contacts and is fastened to the recess by utilizing the threading engagement between the threaded portion of the connection element and the threading element, it is not necessary to provide a fastening member used to fasten the intermediate section, inside of the recess. Therefore, the structure of the recess can be simplified, and the intermediate section can be firmly fastened to the frame assembly.

The component mounting structure of the vehicle may further comprise a cap member which contacts an end surface at the opening of the recess and covers the opening of the recess, the first adjacent component may be retained between the support element and a region of the cap member which is exposed through the opening of the recess.

By use of the cap member having the above structure, the support element baying a relatively simple structure can be realized, and the first adjacent component can be firmly supported.

The above and further objects, features, and advantages of the present invention will more fully be apparent from the following detailed description of the preferred embodiment with the accompanying drawings.

DETAILED DESCRIPTION OF THE EMBODIMENTS

Now, the embodiment and modified examples thereof of the present invention will be described with reference to the drawings. Hereinafter, the stated directions are from the perspective of a rider straddling a straddle-type vehicle.

Embodiment (Straddle-Type Vehicle)

Figure 1:
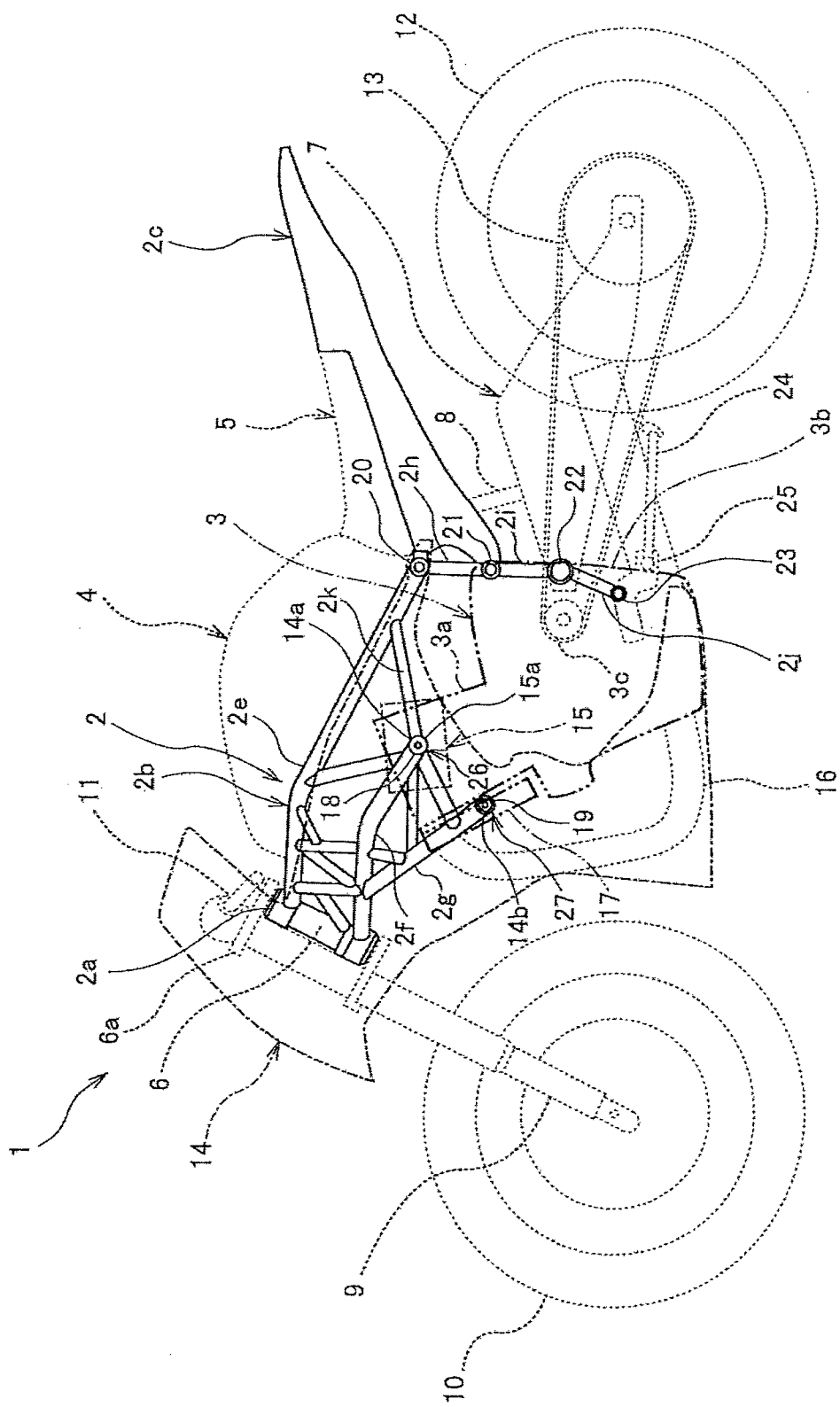
FIG. 1 is a side view showing the overall configuration of a straddle-type vehicle according to an embodiment.

FIG. 1 is a side view showing the overall configuration of a straddle-type vehicle 1 according to an embodiment. In FIG. 1, a solid line indicates a frame assembly 2, a two-dotted line indicates a driving unit 3, and one-dotted lines indicate a cowling 14 and an engine slider 15.

The straddle-type vehicle 1 includes the frame assembly 2 extending rearward from a front side of a vehicle body, the driving unit 3 supportedly mounted to the frame assembly 2 to move the vehicle body, and a fuel tank 4 placed above the frame assembly 2 at a front side of the vehicle body, and a seat 5 placed above the frame assembly 2 at a rear side of the vehicle body. A steering shaft 6 is pivotally attached to the front portion of the frame assembly 2 in a state in which the steering shaft 6 is inclined slightly rearward. A swing arm 7 extends rearward in the vicinity of the center portion of the side surface of the vehicle body. The swing arm 7 is mounted to the frame assembly 2 such that the swing arm 7 is vertically pivotable. A rear suspension 8 extends substantially vertically and is coupled to the swing arm 7 and to the frame assembly 2. A pair of front forks 9 are coupled to the steering shaft 6. A front wheel 10 is rotatable mounted to the lower end of the pair of front forks 9. A handle 11 is coupled to the upper end of the steering shaft 6 via a bracket 6a. A rear wheel 12 is rotatably mounted to the rear end of the swing arm 7.

The driving unit 3 includes an engine 3a, a transmission mechanism 3b, and a drive sprocket 3c attached to the output shaft of the transmission mechanism 3b. A drive chain 13 is wrapped around the drive sprocket 3c to transmit the rotational driving power of the engine 3a to the rear wheel 12.

A cowling 14 is mounted to the frame assembly 2 to partially cover the front portion of the vehicle body and the right and left sides of the vehicle body. A pair of engine sliders 15 are mounted to the frame assembly 2 at the right and left sides of the driving unit 3. The pair of engine sliders 15 are mounted to the frame assembly 2 to partially cover the cowling 14 and the engine 3a Bolt holes 14a, 14b are formed in the right and left side surfaces of the cowling 14. Bolt holes 15a are formed in the pair of engine sliders 15. The cowling 14 and the engine sliders 15 are defined as external components (protecting components) which are exposed outside of the vehicle body to mitigate an impact in a collision between the vehicle body and an external object, thereby reducing damage to the vehicle body, and as first adjacent components placed adjacently to the frame assembly 2.

An exhaust device 16 is coupled to the engine 3a The exhaust device 16 extends downward from the front portion of the engine 3a in the frame assembly 2, and further extends rearward in the vehicle body. A radiator 17 is placed at the front side of the engine 3a to cool the engine 3a during running.

[Frame Assembly]

Referring to FIG. 1, the frame assembly 2 includes a head pipe 2a, a main frame 2b extending rearward from the head pipe 2a, and a rear frame 2c coupled to the rear end portion of the main frame 2b and extending rearward.

Figure 2:
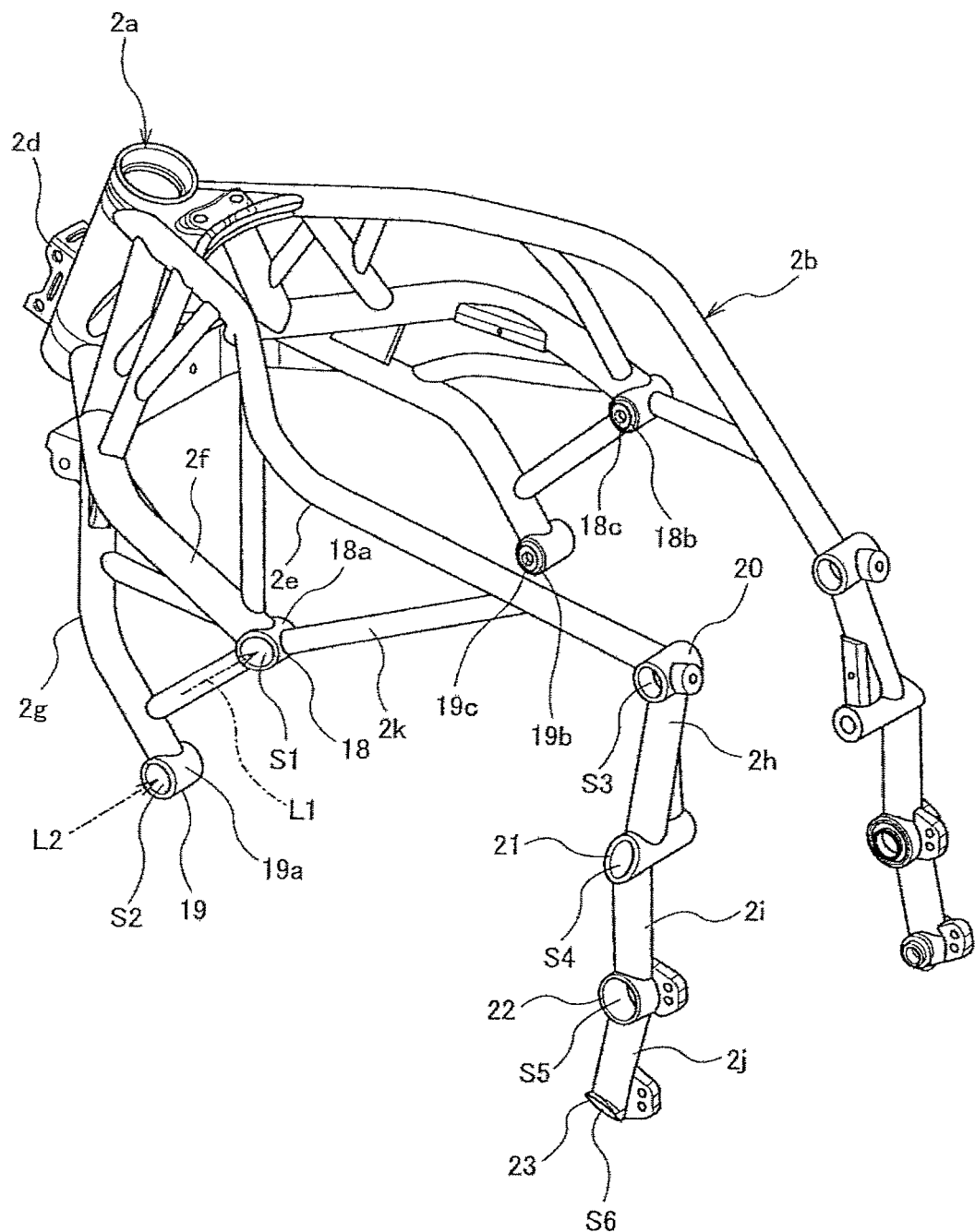
FIG. 2 is a perspective view showing the structure of a head pipe, and the structure of a main frame, of the frame assembly of the straddle-type vehicle of FIG. 1.

FIG. 2 is a perspective view showing the structure of the head pipe 2a, and the structure of the main frame 2b, of the frame assembly 2 of the straddle-type vehicle 1 of FIG. 1. Referring to FIG. 2, the steering shaft 6 (see FIG. 1) is mounted to the head pipe 2a such that the steering shaft 6 is pivotable around the head pipe 2a A bracket 2d used to fasten the front portion of the cowling 14 is coupled to the side portion of the head pipe 2a.

The main frame 2b includes right and left parts which are symmetric in a vehicle width direction (rightward and leftward direction) of the vehicle body. Each of the right and left parts of the main frame 2b includes a first frame member 2e extending rearward from the head pipe 2a, a second frame member 2f extending rearward from the head pipe 2a in a location that is below the first frame member 2e, a third frame member 2g extending rearward from the head pipe 2a in a location that is below the second frame member 2f, and a plurality of extension frame members 2h, 2i, 2j extending downward from the rear end of the first frame member 2e. The plurality of extension frame members 2h, 2i, 2j are arranged in this order from an upper side. Further, the main frame member 2b includes a plurality of coupling frame members 2k used to couple the first frame member 2e and the second frame member 2f to each other in a truss shape and to couple the second frame member 2f and the third frame member 2g to each other in a truss shape.

The main frame 2b includes a plurality of pipe-shaped members. However, this is exemplary. For example, the main frame 2b may include a member manufactured by die casting, by use of a metal such as aluminum.

The main frame 2b is provided with a plurality of tubular sections 18 to 23. Specifically, the first tubular section 18 is provided on the rear end portion of the second frame member 2f. The second tubular section 19 is provided on the rear end portion of the third frame member 2g. The third tubular section 20 is provided on the rear end portion of the first frame member 2e. The fourth tubular section 21 is provided between the extension frame member 2h and the extension frame member 2i The fifth tubular section 22 is provided between the extension frame member 2i and the extension frame member 2j. The sixth tubular section 23 is provided on the extension frame section 2j. The plurality of tubular sections 18 to 23 are opened laterally. The first tubular section 18, the third tubular section 20, the fourth tubular section 21, and the fifth tubular section 22 serve to couple the outer peripheral portions of adjacent frame members, of the frame members 2e to 2i. In brief, the frame assembly 2 includes a plurality of frame members 2e to 2i which are two or more elongated sections, and the tubular sections 18 to 23 as the coupling sections having the outer peripheral portions coupled to any of the frame members 2e to 2i.

Each of the tubular sections 18 to 23 is configured such that its axis extends in a direction perpendicular to the lengthwise direction of the corresponding adjacent elongated section. The tubular sections 18 to 23 are formed with recesses S1 to S6, respectively. The recesses S1 to S6 are opened laterally and recessed inward. The recesses S1 to S6 of the tubular sections 18 to 23 are recessed in predetermined directions. The inner spaces of the recesses S1 to S6 are formed as the inner spaces of the tubular sections 18 to 23 as the coupling sections, respectively. Each of the tubular sections 18 to 23 is used to fasten one or more structural components to the frame assembly 2.

Specifically, in the straddle-type vehicle 1, the driving unit 3 which is a second adjacent component which is adjacent to the frame assembly 2 is fastened to the main frame 2b by use of fastener members via boll holes formed in the recesses S1 of the pair of right and left first tubular sections 18 of the main frame 2b bolt holes formed in the recesses S4 of the pair of right and left fourth tubular sections 21 of the main frame 2b, bolt holes formed in the recesses S5 of the pair of right and left fifth tubular sections 22 of the main frame 2h, and a bolt hole formed in the recess S6 of the sixth tubular section 23 at a left side. The fastener members corresponding to the fifth tubular sections 22 and the sixth tubular section 23 are fastened to a bracket (not shown) coupled to the driving unit 3. In this way, the driving unit 3 is fastened to the main frame 2b.

As shown in FIGS. 1 and 2, the rear frame 2c is fastened to the main frame 2b by use of fastener members via the pair of right and left third tubular sections 20 and the pair of right and left fourth tubular sections 21. A pivot shaft (not shown) to which the swing arm 7 is pivotally attached is fastened to the pair of right and left fifth tubular sections 22 by use of fastener members. A stand bracket 25 used to support a stand 24 which allows the straddle-type vehicle 1 to stand on the ground is fastened to the sixth tubular section 23 at a left side.

A first mounting unit 26 is fastened to the first tubular section 18. A second mounting unit 27 is fastened to the second tubular section 19. In the straddle-type vehicle 1, the cowling 14 is mounted to the frame assembly 2 by use of the first mounting unit 26 and the second mounting unit 27. The engine slider 15 is mounted to the frame assembly 2 by use of the first mounting unit 26. Thus, the first mounting unit 26 is used as the mounting unit for mounting the cowling 14 and the engine slider 15 to the frame assembly 2.

[First Mounting Unit]

Figure 3:
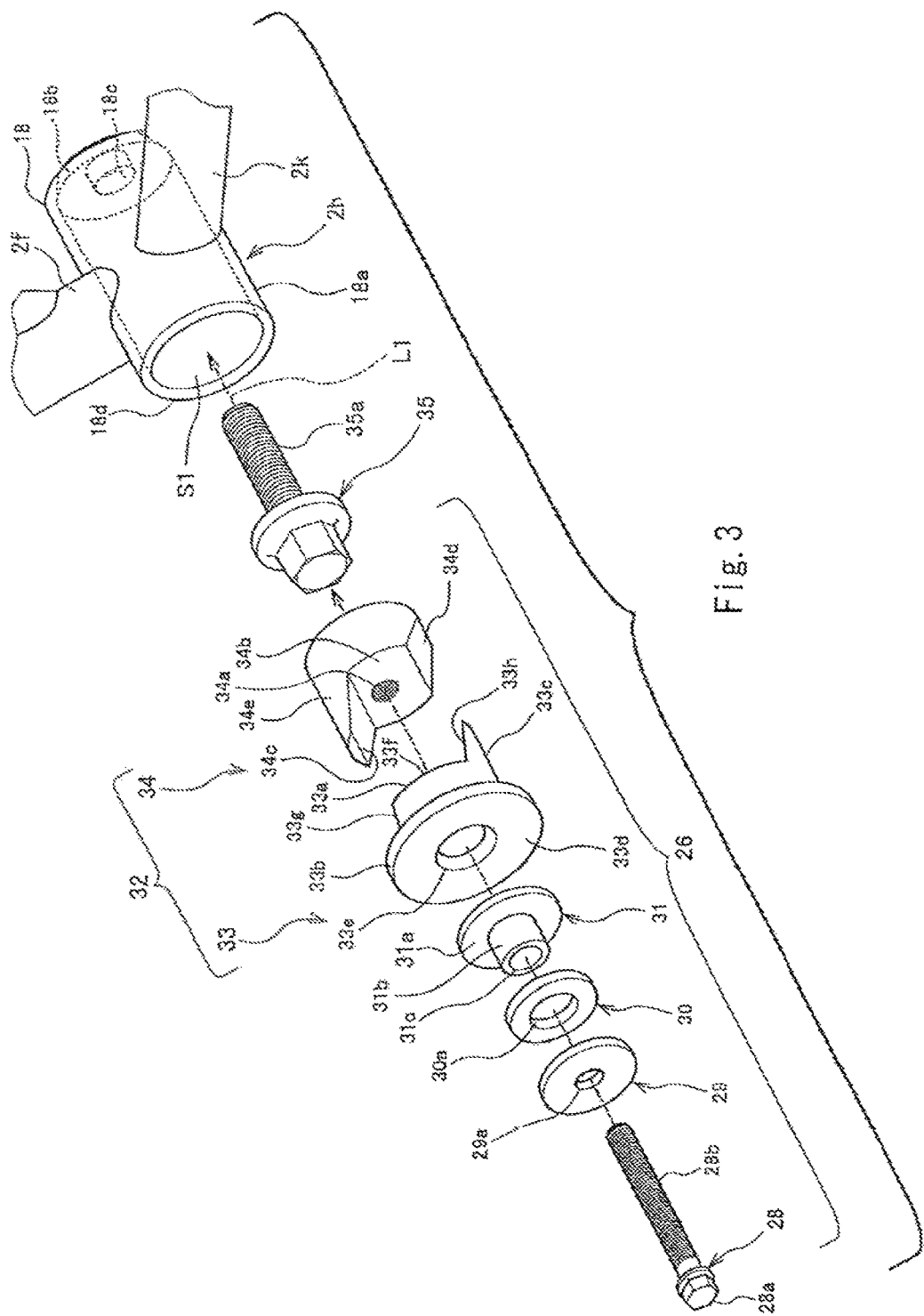
FIG. 3 is a view showing the configuration of a first mounting unit and a method of mounting the first mounting unit to the first tubular section of the main frame.
Figure 4:
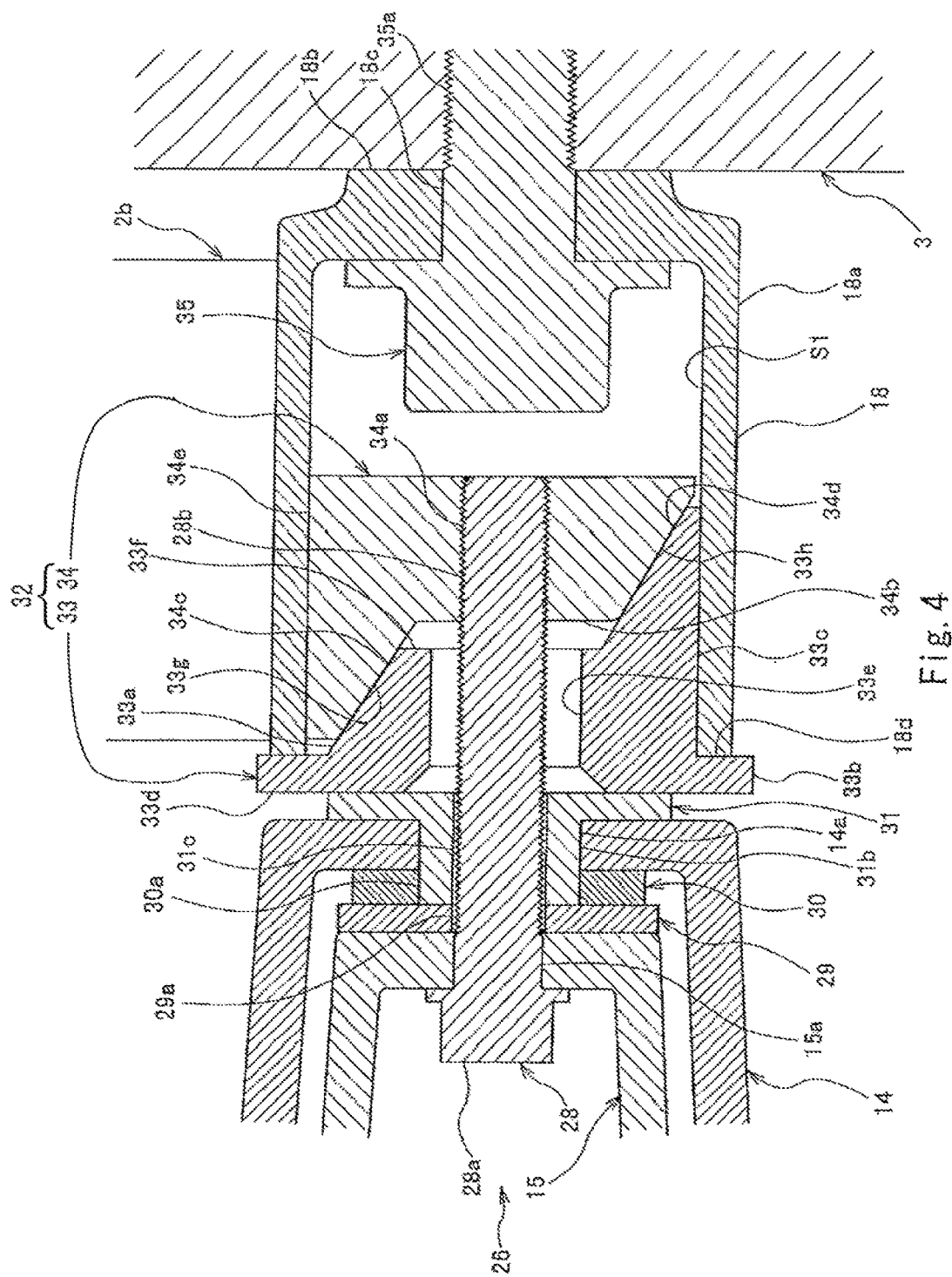
FIG. 4 is a cross-sectional view showing a structure of a region in the vicinity of the first tubular section, in a state in which the first mounting unit is inserted into a recess.

Now, the first tubular section 18 and the first mounting unit 26 fastened to the recess S1 of the first tubular section 18 will be described with reference to FIGS. 3 and 4. FIG. 3 is a view showing the configuration of the first mounting unit 26 and a method of mounting the first mounting unit 26 to the first tubular section 18 of the main frame 2b. FIG. 4 is a cross-sectional view showing a structure of a region in the vicinity of the first tubular section 18, in a state in which the first mounting unit 26 is inserted into the recess S1.

As shown in FIG. 3, the first tubular section 18 has a bottomed cylindrical shape, and includes an outer peripheral portion 18a and a bottom portion 18b. The second frame member 2f and the coupling frame member 2k which are the adjacent elongated sections are coupled to each other via the outer peripheral portion 18a of the first tubular section 18. The bottom portion 18b is located inward in the vehicle width direction. In this way, the first tubular section 18 is formed with the recess S1 having, the inner space. The bottom portion 18b is formed with a bolt hole 18c. The first tubular section 18 has an end surface 18d on the peripheral edge of the opening of the outer peripheral portion 18a.

As shown in FIGS. 3 and 4, the first mounting unit 26 includes a first adjacent component mounting bolt 28, a metal washer 29, a rubber washer 30, a bush 31, and an intermediate section 32.

The first adjacent component mounting bolt 28 is a mounting member used to mount the cowling 14 and the engine slider 15 to the main frame 2b. The first adjacent component mounting bolt 28 includes a head portion 28a which is a support element exposed outside and supporting the cowling 14 and the engine slider 15, and a shaft portion 28b (threaded portion) which is a connection element accommodated in the recess S1 and connected to the intermediate section 32 in the inner space of the recess S1. The head portion 28a may have a threaded groove, or may not have a hexagonal shape. The shaft portion 28b is inserted into the bolt hole 14a of the cowling 14 and the bolt hole 15a of the engine slider 15. In FIG. 3, the cowling 14 and the engine slider 15 are not shown.

The bush 31 includes a base portion 31a of a substantially disc shape and a cylindrical collar 31b protruding outward from one of the surfaces of the base portion 31a. The collar 31b is formed with a bolt hole 31c into which the shaft portion 28b is insertable.

The metal washer 29 has a bolt hole 29a with an inner diameter that is larger than the diameter of the shaft portion 28b and smaller than the outer diameter of the collar 31b of the bush 31. The rubber washer 30 has an opening 30a with an inner diameter that is larger than the outer diameter of the collar 31b of the bush 31. The rubber washer 30 is placed on one of the surfaces of the metal washer 29 and the surface of the peripheral edge of the bolt hole 14a of the cowling 14. The metal washer 29 and the rubber washer 30 are placed to overlap with each other in such a manner that the center of the bolt hole 29a and the center of the opening 30a are substantially aligned with the center of the bolt hole 14a of the cowling 14 and the center of the bolt hole 15a of the engine slider 15.

The intermediate section 32 is removably fastened to the frame assembly 2 in the recess S1. The intermediate section 32 includes a fastening element 33 and a threading element 34. The fastening element 33 includes a body 33a accommodated into the recess S1 and a flange 33b configured to contact the end surface 18d. The body 33a has a substantially disc shape when viewed from above. The peripheral surface 33c of the body 33a has a shape for allowing the peripheral surface 33c to pressingly contact the inner peripheral surface of the recess S1. The flange 33b serves as a restricting section which contacts the end surface 18d and thereby restricts the displacement of the intermediate section 32 in a direction L1 in which the recess S1 is recessed, namely, the direction in which the intermediate section 32 is inserted into the recess S1. The outer surface 33d of the flange 33b which is closer to the bush 31 is flat to enable the surface contact of the outer surface 33d with the base portion 31a of the bush 31, A bolt hole 33e is formed in the center region of the fastening element 33. The bolt hole 33e has a size for allowing the fastening element 33 to be displaced with respect to the shaft portion 28b in the radial direction of the shaft portion 28b. As shown in FIGS. 3 and 4, the fastening element 33 has a first inclined surface 33g and a second inclined surface 33h in a surface 33f facing, the bottom portion 18b of the tubular section 18. The first inclined surface 33g and the second inclined surface 33h are arranged at both sides of the bolt hole 33e in the radial direction of the fastening element 33, when viewed from above. The first inclined surface 33g is inclined from the bolt hole 33e toward the outer periphery of the body 33a, to form a downward slope. The second inclined surface 33h is inclined from the bolt hole 33e toward the outer periphery of the body 33a, to form an upward slope.

The threading element 34 is substantially disc shaped when viewed from above. The threading element 34 has a size suitable to be accommodated into the recess S1. A threaded hole 34a is formed in the center region of the threading element 34. A female thread is formed in the inner peripheral surface of the threaded hole 34a The shaft portion 28b is threadingly engageable with the female thread. As shown in FIG. 3, the threading element 34 has a first inclined surface 34c and a second inclined surface 34d in a surface 34b facing the fastening element 33. The first inclined surface 34c and the second inclined surface 34d are arranged at both sides of the threaded hole 34a in the radial direction of the threading element 34, when viewed from the axial direction of the first adjacent component mounting bolt 28. The first inclined surface 34c is inclined from the threaded hole 34a toward the outer periphery, to form an upward slope. The second inclined surface 34d is inclined from the threaded hole 34a toward the outer periphery, to form a downward slope. The peripheral surface 34e of the threading element 34 has a shape for allowing the peripheral surface 34e to pressingly contact the inner peripheral surface of the recess S1, as in the peripheral surface 33c of the fastening element 33. In this way, the threading element 34 also serves as a second fastening element in the intermediate section 32.

As shown in FIGS. 3 and 4, in the intermediate section 32, the fastening element 33 and the threading element 34 are placed in such a manner that the first inclined surface 33g and the first inclined surface 34c face each other, and the second inclined surface 33h and the second inclined surface 34d face each other. The first inclined surface 33g and the first inclined surface 34c have a predetermined inclination angle with respect to the radial direction of the first adjacent component mounting bolt 28 so that the first inclined surface 33g and the first inclined surface 34c are in surface contact with each other in a state in which the fastening element 33 and the threading element 34 are joined together. Also, the second inclined surface 33h and the second inclined surface 34d have a predetermined inclination angle with respect to the radial direction of the first adjacent component mounting bolt 28 so that the second inclined surface 33h and the second inclined surface 34d are in surface contact with each other in a state in which the fastening element 33 and the threading element 34 are joined together.

When the driving unit 3 is fastened to the main frame 2b via the first tubular section 18, the driving unit mounting bolt 35 is threadingly engaged with the driving unit 3 by inserting the shaft portion 35a of the driving unit mounting bolt 35 into the bolt hole 18c, in this way, the driving unit 3 is fastened to the main frame 2b.

[Mounting of the Cowling 14 and the Engine Slider 15 by Use of the First Mounting Unit 26]

In the straddle-type vehicle 1, the cowling, 14 and the engine slider 15 can be mounted to the first tubular section 18 by use of the first mounting unit 26, according to the following procedure.

As shown in FIG. 4, initially, the shaft portion 28b of the first adjacent component mounting bolt 28 is inserted into the bolt hole 15a of the engine slider 15, the bolt hole 29a of the metal washer 29, and the opening 30a of the rubber washer 30, in this order. Then, the shaft portion 28b of the first adjacent component mounting bolt 28 is inserted into the bolt hole 14a of the cowling 14, the bolt hole 31c of the bush 31, and the bolt hole 33e of the fastening, element 33 in this order, and the tip end of the shaft portion 28b is temporarily threadingly engaged with the threaded hole 34a of the threading element 34. At this time, the fastening element 33 and the threading element 34 are positioned around the first adjacent component mounting bolt 28 so that the first inclined surface 33g, and the first inclined surface 34c face each other, and the second inclined surface 33h and the second inclined surface 34d face each other. Then, the threading element 34 is accommodated into the recess S1 and the flange 33b of the fastening element 33 is brought into contact with the end surface 18d. In this state, the first adjacent component mounting bolt 28 is tightened into the threaded hole 34a of the threading element 34.

At this time, the flange 33b contacts the end surface 18d at the opening of the recess S1, and thereby the displacement of the fastening element 33 in the direction L1. Because of this, the fastening element 33 can be positioned easily with respect to the first tubular section 18. As a result, mounting of the cowling 14, the engine slider 15, and the intermediate section 32, in the recess S1, can be carried out easily.

Figure 5:
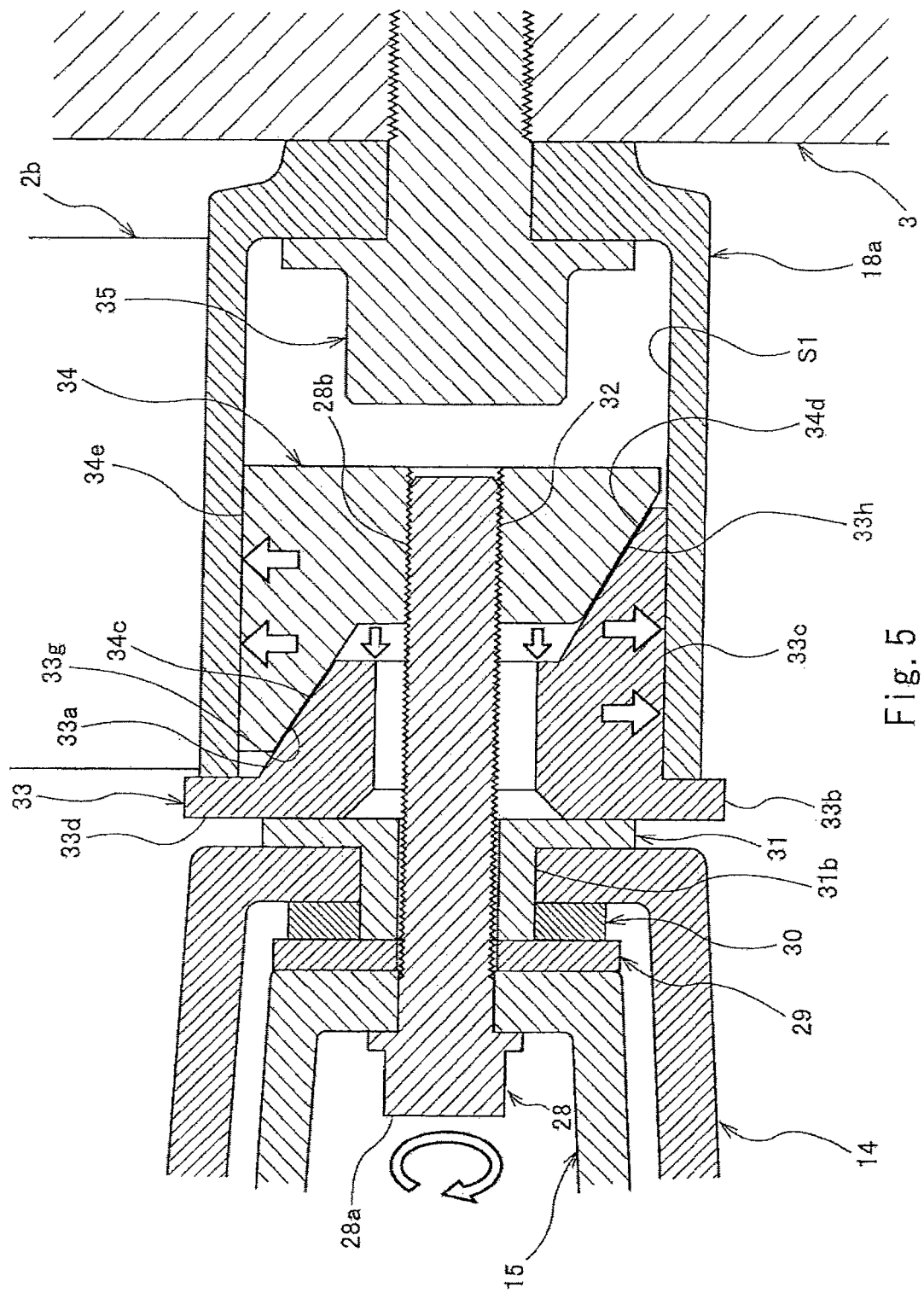
FIG. 5 is a cross-sectional view showing, a method of fastening, the first mounting unit to the recess.

When the threading engagement between the shaft portion 28b and the threaded hole 34a of the threading element 34 progresses to some extent, the first inclined surface 33g and the first inclined surface 34c are in surface contact with each other, and the second inclined surface 33h and the second inclined surface 34d are in surface contact with each other. As shown in FIG. 5, when the threading engagement between the shaft portion 28b and the threaded hole 34a of the threading element 34 further progresses, the threading element 34 gets closer to the fastening element 33. Concurrently, the first inclined surface 33g of the fastening element 33 is guided to the first inclined surface 34c of the threading element 34, and the second inclined surface 33h of the fastening element 33 is guided to the second inclined surface 34c of the threading element 34. At this time, the axial force of the shaft portion 28b is converted into the radial force of the shaft portion 28b by contact between the first inclined surface 33g and the first inclined surface 34c, and contact between the second inclined surface 33h and the second inclined surface 34d, in the fastening element 33 and the threading element 34. This force causes the fastening element 33 to be moved in the radial direction of the shaft portion 28b, and the peripheral surface 33c of the fastening element 33 to pressingly contact the inner peripheral surface of the recess S1. Concurrently, the peripheral surface 34e of the threading element 34 pressingly contacts the inner peripheral surface of the recess S1. In this way, the intermediate section 32 is fastened to the main frame 2b. The intermediate section 32 can be unfastened easily from the main frame 2b in such a manner that the shaft portion 28b is disengaged from the threaded hole 34a of the threading element 34, and the fastening, element 33 and the threading element 34 are released from the inner peripheral surface of the recess S1.

In the above-described manner, the intermediate section 32 is caused to pressingly contact the inner peripheral surface of the recess S1 or to be moved away from the inner peripheral surface of the recess S1, and thus the first mounting unit 26 is removably mounted to the recess S1. In this way, the first mounting unit 26 is removably fastened to the main frame 2b via the recess S1.

As shown in FIG. 5, when tightening of the shaft portion 28b into the threaded hole 34a progresses, the peripheral portion of the bolt hole 15a of the engine slider 15 pressingly contacts the peripheral portion of the bolt hole 14a of the cowling 14, via the rubber washer 30 and the metal washer 29. The peripheral portion of the bolt hole 14a of the cowling 14 pressingly contacts the outer surface 33d of the flange 33b of the fastening element 33, via the hush 31. Thus, the shaft portion 28b of the first adjacent component mounting bolt 28 is threadingly engaged with the intermediate section 32, while the head portion 28a of the first adjacent component mounting bolt 28 supports the cowling 14 and the engine slider 15, in a location that is outside of the opening, of the recess S1. This allows the cowling 14 and the engine slider 15 to be firmly fastened to the first mounting unit 26. As a result, the cowling 14 and the engine slider 15 can be stably mounted to the frame assembly 2.

In a case where the first mounting unit 26 is used to mount the cowling 14 and the engine slider 15, the mounting with can be reduced in number, than in a case where the cowling 14 and the engine slider 15 are independently mounted to the main frame 2b, because the cowling 14 and the engine slider 15 are fastened together to the main frame 2b by the threading element between the first adjacent component mounting bolt 28 and the threading element 34.

Since the cowling 14 and the engine slider 15 are mounted to the main frame 2b via one recess S1, namely, one mounting location, the structure of the main frame 2b can be simplified.

The intermediate section 32 pressingly contacts the inner peripheral surface of the recess S1 in a state in which the intermediate section 32 is apart from the driving unit mounting bolt 35. If an external force is applied, to the cowling 14 or the engine slider 15, this external force is transmitted to the frame assembly 2 via the first mourning unit 26 and dispersed. In other words, this force is less likely to be directly transmitted to the driving unit 3. This makes it possible to support the driving unit 3 by the frame assembly 2, while preventing the external force from being, directly applied to the driving unit 3.

If the external component collides with the cowling 14 or the engine slider 15, an impact generated by the collision can be transmitted from the first tubular section 18 to the whole of the frame assembly 2 in a dispersed manner. Therefore, it becomes possible to prevent deformation or the like of the region around the first tubular section 18.

[Second Mounting Unit]

Figure 6:
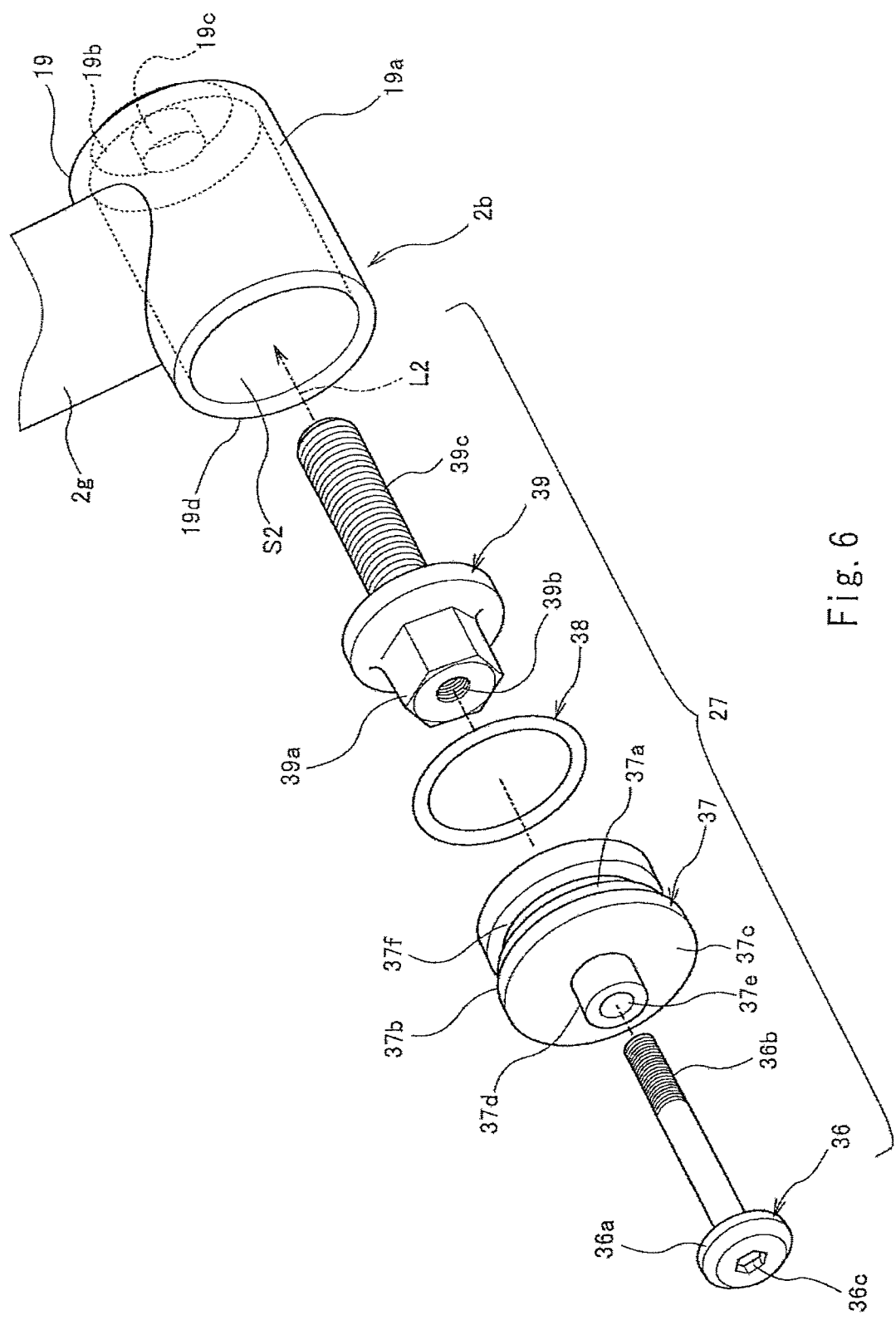
FIG. 6 is a view showing the configuration of a second mounting unit and a method of mounting the second mounting unit to the second tubular section of the main frame.
Figure 7:
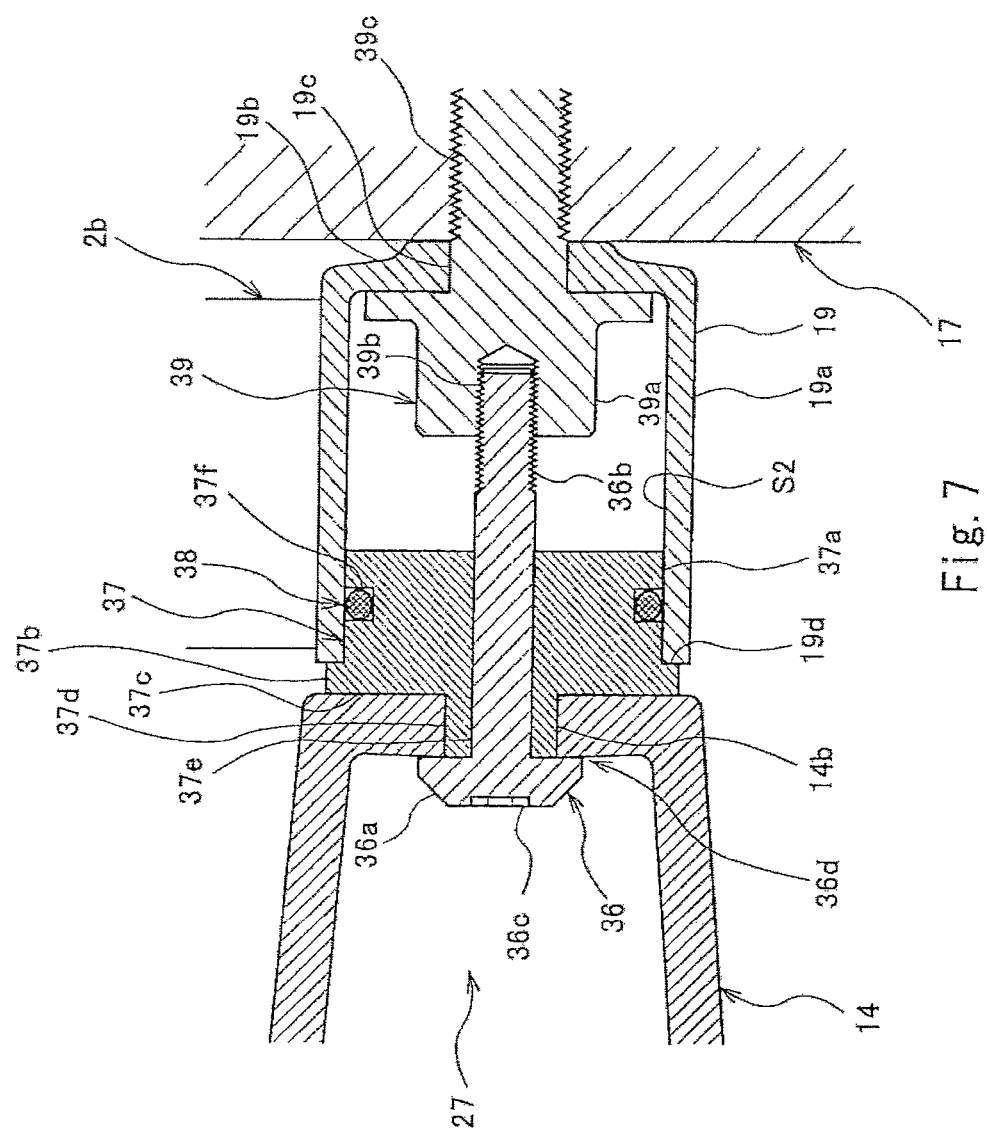
FIG. 7 is a cross-sectional view showing a structure of a region in the vicinity of the second tubular section, in a state in which the second mounting unit is inserted into the recess.

Now, the second tubular section 19 and the second mounting unit 27 fastened to the recess S2 of the second tubular section 19 will be described with reference to FIGS. 6 and 7. FIG. 6 is a view showing the configuration of the second mounting unit 27 and a method of mounting the second mounting unit 27 to the second tubular section 19 of the main frame 2b. FIG. 7 is a cross-sectional view showing a structure of a region in the vicinity of the second tubular section 19, in a state in which the second mounting unit 27 is inserted into the recess S2.

As in the first tubular section 18, the second tubular section 19 has a bottomed cylindrical shape, and includes an outer peripheral portion 19a and a bottom portion 19b. The third frame member 2g is coupled to the outer peripheral portion 19a. The bottom portion 19b is located inward in the vehicle width direction. In this way, the second tubular section 19 is formed with the recess S2 having the inner space. The bottom portion 19b is formed with a bolt hole 19c. The second tubular section 19 has an end surface 19d on the peripheral edge of the opening of the outer peripheral portion 19a.

The second mounting unit 27 includes a first adjacent component mounting bolt 36, a cap member 37, an O-ring 38 and a radiator mounting bolt 39.

The first adjacent component mounting bolt 36 is a mounting member used to mount the cowling 14 to the main frame 2b. The first adjacent component mounting bolt 36 includes a head portion 36a and a shaft portion 36b. The head portion 36a is a support element which is continuous with the shaft portion 36b and supports the cowling 14 in a state in which the head portion 36a is exposed outside through the opening of the recess S2. The head portion 36a is a support element supporting the cowling 14. The head portion 36a is formed with a threaded groove 36c into which a hexagonal wrench is insertable. The shaft portion 36b is a connection element accommodated into the recess S2 and connected to a head portion 39a of the radiator mounting bolt 39 in the inner space of the recess S2.

The radiator mounting bolt 39 is a driving unit mounting bolt used to fasten a radiator 17 as the second adjacent component to the main frame 2b. The head portion 39a of the radiator mounting bolt 39 is formed with a female thread 39b which is threadingly engageable with the shaft portion 36b of the first adjacent component mounting bolt 36. The head portion 39a serves as an intermediate section accommodated into the recess S2 and removably fastened to the frame assembly 2. A shaft portion 39c is continuous with the head portion 39a.

The shaft portion 39c is threadingly engaged with the driving unit 3 in a direction that is opposite to the direction in which the shaft portion 36b is threadingly engaged with the female thread 39b. This makes it possible to appropriately prevent a situation in which the radiator mourning bolt 39 is rotated together with the first adjacent component mourning bolt 36 and is disengaged, in a case where the first adjacent component mounting bolt 36 is removed from the radiator mounting bolt 39.

The cap member 37 includes a body 37a accommodated into the recess S2 and a flange 37b which contacts an end surface 19d of the second tubular section 19 and covers the opening of the second tubular section 19. A collar 37d protrudes outward from the outer surface 37c of the cap member 37. The collar 37d is formed with a hole 37e into which the shaft portion 36b is insertable. The body 37a is formed with a groove 37f extending in a circumferential direction. The O-ring 38 is fitted into the groove 37f such that the O-ring 38 slightly protrudes outward in the circumferential direction of the body 37a.

In a case where the radiator 17 is fastened to the main frame 2b via the second tubular section 19, the shaft portion 39c of the radiator mounting bolt 39 is inserted into the bolt hole 19c formed in the bottom portion 19b of the second tubular section 19. Then, the shaft portion 39c is threadingly engaged with the radiator 17, and thus the radiator 17 is fastened to the main frame 2b. As a result, the head portion 39a as the intermediate section is accommodated into the recess S2 and removably fastened to the main frame 2b.

[Mounting of the Cowling 14 by Use of the Second Mounting Unit 27]

In the straddle-type vehicle 1, the cowling 14 can be mourned to the second tubular section 19 of the main frame 2b by use of the second mounting unit 27, according to the following procedure.

Initially, the shaft portion 36b of the first adjacent component mounting bolt 36 is inserted into the bolt hole 14b (see FIGS. 1 and 7) of the cowling 14 and the hole 37e of the cap member 37, in this order. The collar 37d of the cap member 37 is inserted into the bolt hole 14b of the cowling 14. The O-ring 38 is fitted into the groove 37f of the body 37a. Then, the cap member 37 is placed in the second tubular section 19 such that the flange 37b contacts the end surface 19d and the cap member 37 covers the opening of the recess S2. At this time, the O-ring 38 pressingly contacts and is fitted to the inner peripheral surface of the recess 82, which allows the cap member 37 to be retained to some extent in the second tubular section 19. This makes it possible to easily carry out the operation for mounting the cowling 14 and the first adjacent component mounting bolt 36, in the recess S2. The flange 37b contacts the end surface 19d and thus serves as a restricting section for restricting the position of the cap member 37 in a direction L2 in which the recess S2 is recessed, namely, the direction in which the cap member 37 is inserted into the recess S2. Thus, the cap member 37 can be placed in a proper position with respect to the second tubular section 19.

Then, the hexagonal wrench is inserted into the threaded groove 36c, and the shaft portion 36b is threadingly engaged with the female thread 39b. When tightening of the first adjacent component mounting bolt 36 with respect to the female thread 39b progresses, the cowling 14 is retained by the second mounting unit 27 via a retaining section 36d formed between the head portion 36a and the collar 37d of the cap member 37. The cowling 14 is mounted to the main frame 2b in such a way that the cowling 14 is supported by the head portion 36a.

By loosening the shaft portion 36b threadingly engaged with the female thread 39b, the first adjacent component mounting, bolt 36 and the cowling 14 can be easily detached from the main frame 2b.

In the case where the cowling 14 is mounted to the main frame 2b by use of the second mounting unit 27, as tightening of the first adjacent component mounting, bolt 36 progresses, the peripheral edge of the bolt hole 14b of the cowling 14 pressingly contacts the outer surface 37c of the cap member 37. This allows the cowling 14 to be stably mounted to the cap member 37. In this way, the second mourning unit 27 is able to stably support the cowling 14 with a relatively simple structure. In addition, the O-ring 38 fitted into the groove 37f allows the cap member 37 and the inner peripheral surface of the recess S2 to contact each other in a sealing manner. Therefore, the cap member 37 can be properly mounted to the second tubular section 19 while preventing a situation in which the cap member 37 is unsteadily fastened to the second tubular section 19.

As described above, in the straddle-type vehicle 1, the cowling 14 and the engine slider 15 are mounted to the main frame 2b by connecting the first adjacent component mounting bolt 28 to the intermediate section 32 fastened to inside of the recess S1. Further, the cowling 14 is mounted to the main frame 2b by connecting the first adjacent component mounting bolt 36 to the head portion 39a of the radiator mounting bolt 39 placed inside of the recess S2. By utilizing the recesses S1, S2 as the mounting sections used to mount at least one of the cowling 14 and the engine slider 15, the straddle-type vehicle 1 can lessen a structural limitation on mounting of the cowling 14 and the engine slider 15 to the frame assembly 2. Therefore, it becomes possible to realize the component mounting structure of the vehicle which allows the vehicle body to be designed more flexibly.

Further, in the straddle-type vehicle 1, the fastening section of the first mounting unit 26 which is fastened to the main frame 2b is not exposed outside of the first tubular section 18, and the fastening section of the second mounting unit 27 which is fastened to the main frame 2b is not exposed outside of the second tubular section 19. Therefore, it becomes possible to prevent a situation in which the external structure of the frame assembly 2 becomes complex in a state in which the first mounting unit 26 and the second mounting unit 27 are fastened to the main frame 2b.

Since the recesses S1, S2 are used, it is not necessary to form in the main frame 2b a threaded hole used to mount the cowling 14 or the engine slider 15, or form on the main frame 2b, a member such as a bracket or a welding nut used to mount the cowling 14 or the engine slider 15, by welding or the like. Because of this, it is not necessary to increase the thickness of the main frame 2b, which can prevent an increase in the weight of the vehicle.

The fastening element 33 and the threading element 34 of the intermediate section 32 of the first mounting unit 26 pressingly contact the inner peripheral surface of the recess S1, and are removably fastened to the main frame 2b by a frictional force generated by the contact. In contrast, the radiator mounting bolt 39 including the head portion 39a as the intermediate section of the second mounting unit 27 is removably fastened to the main frame 2b by threading engagement with the driving unit 3. This can eliminate a need to provide a structure for fastening the intermediate section 32 and the radiator mounting bolt 39 to the main frame 2b. Therefore, the intermediate section 32 and the radiator mounting bolt 39 can be firmly fastened to the main frame 2b while preventing a situation in which the internal structures of the recesses S1, S2 to which the intermediate section 32 and the radiator mounting bolt 39 are fastened becomes complex.

The first mounting unit 26 is configured such that the first adjacent component mounting bolt 28 as the mounting member and the intermediate section 32 are separate members. Also, the second mounting unit 27 is configured such that the first adjacent component mounting bolt 36 as the mounting member and the radiator mounting bolt 39 including the head portion 39a as the intermediate section are separate members, in this configuration, the mounting member (first adjacent component mounting bolt 28 or the first adjacent component mounting bolt 36) mounted to the cowling 14 or the engine slider 15 can be reduced in size. Therefore, an operator can easily mount the mounting member to the cowling 14 or the engine slider 15. In this configuration, the operator can more easily mount the cowling 14 or the engine slider 15 to the main frame 2b as compared to a case where the cowling 14 or the engine slider 15 is mounted to the main frame 2b by use of a mounting unit including a mounting member and an intermediate section which are integrated.

In the first mounting unit 26, the first adjacent component mounting bolt 28 and the intermediate section 32 are coupled to each other by threading engagement between the shall portion 28h and the threaded hole 34a In the second mounting unit 27, the first adjacent component mounting bolt 36 and the radiator mounting bolt 39 are coupled to each other by threading engagement between the shaft portion 36b and the female thread 39b. By use of the first mounting unit 26 or the second mounting unit 27, the cowling 14 or the engine slider 15 can be removably and stably mounted to the main frame 2b.

In the first tubular section 18, by use of the common recess S1, the cowling 14 and the engine slider 15 can be mounted to the main frame 2b, and the driving unit 3 can be mounted to the main frame 2b. In the same manner, in the second tubular section 19, by use of the common recess S2, the radiator 17 can be mounted to the main frame 2b, and the cowling 14 can be mounted to the main frame 2b. This can reduce the number of the tubular sections formed on the main frame 2b, and simplify the structure of the main frame 2b.

By use of the first mounting unit 26 and the second mounting unit 27, the cowling 14 or the engine slider 15 can be firmly mounted to a frame assembly having the existing recess formed for a purpose other than the purpose of mounting the cowling 14 or the engine slider 15.

Modified Example 1

Figure 8:
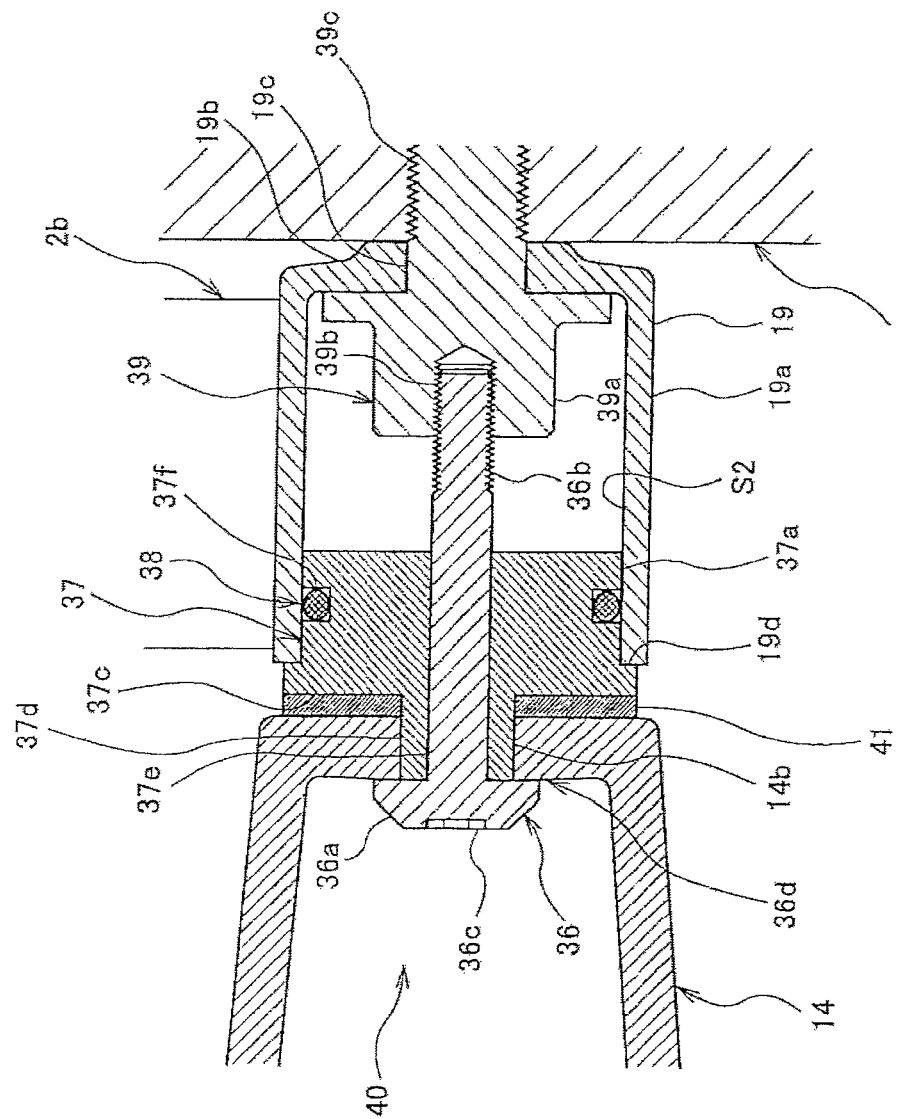
FIG. 8 is a cross-sectional view showing a structure of a region in the vicinity of the second tubular section, in a state in which the second mounting, unit according to Modified Example 1 is inserted into the recess.

FIG. 8 is a cross-sectional view showing a structure of a region in the vicinity of the second tubular section 19, in a state in which a second mounting unit 40 according to Modified Example 1 is fastened to the recess S2. As shown in FIG. 8, the second mounting unit 40 includes the first adjacent component mounting bolt 36, the cap member 37, the O-ring 38, the radiator mounting bolt 39, and a rubber washer 41.

The first adjacent component mounting bolt 36 has the same configuration as that of the above-described embodiment, and is used as the mounting member for mounting the cowling 14 to the main frame 2b. The head portion 36a is a support element which is exposed outside through the opening of the recess S2 and supports the cowling 14. The shaft portion 36b is a connection element connected to the head portion 39a in the inner space of the recess S2. The head portion 39a is an intermediate section which is accommodated in the recess S2 and removably fastened to the main frame 2b.

The rubber washer 41 is placed between the cowling 14 and the outer surface 37c of the cap member 37. The thickness of the rubber washer 41 is set so that a sum of the thickness of the rubber washer 41 and the thickness of the cowling 14 is slightly larger than the height of the collar 37d of the cap member 37.

By use of the second mounting unit 40 configured as described above, and the recess S2, a structural limitation on mounting of the cowling 14 to the frame assembly 2 can be lessened. Also, since it is not necessary to provide thrill on the main frame 2b a member such as a bracket or a welding nut used to mount the cowling 14, the structure of the frame assembly 2 can be simplified. Therefore, it becomes possible to realize the component mounting structure of the vehicle which allows the vehicle body to be designed more flexibly.

Furthermore, in Modified Example 1, when the shaft portion 36b is tightly fitted to the female thread 39b, the cowling 14 pressingly contacts the outer surface 37c of the cap member 37 via the rubber washer 41 as the tightening progresses. In this way, the cowling 14 can be mounted to the main frame 2b stably in a state in which the cowling 14 is in contact with the surface of the rubber washer 41 in a sealing manner. Since the cowling 14 pressingly contacts the outer surface 37c of the cap member 37 via the rubber washer 41, it becomes possible to prevent a situation in which the cowling 14 is unsteadily fastened to the cap member 37. As a result, the mounting accuracy of the cowling 14 with respect to the cap member 37 and the second tubular section 19 can be improved.

The thickness of the rubber washer 41 may be set as desired. The rubber washer 41 may include two or more washers stacked together. By adjusting the thickness of the whole of the rubber washer 41 in this way, the location where the cowling 14 is mounted to the second tubular section 19 by use of the second mounting unit 40 can be adjusted accurately, which is an advantage.

Modified Example 2

Figure 9:
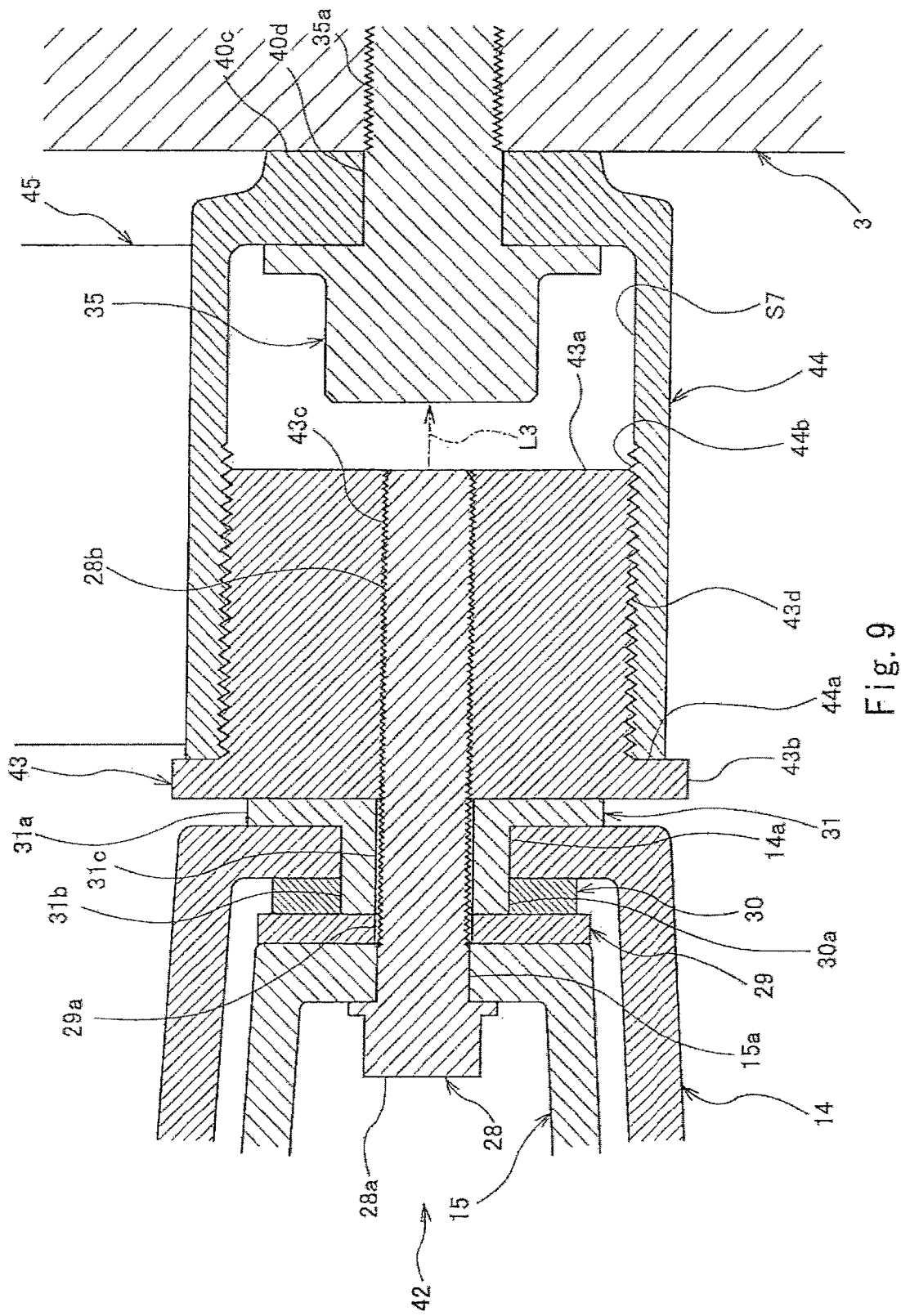
FIG. 9 is a cross-sectional view showing a structure of a region in the vicinity of a tubular section, in a state in which a third mounting unit according to Modified Example 2 is inserted into the recess.

FIG. 9 is a cross-sectional view showing a structure of a region in the vicinity of a tubular section 44, in a state in which a third mounting unit 42 according to Modified Example 2 is fastened to a recess S7. As shown in FIG. 9, the third mounting unit 42 includes the first adjacent component mounting bolt 28, the metal washer 29, the rubber washer 30, the bush 31, and a threading, element 43.

The first adjacent component mounting bolt 28 is used as the mounting member for mounting the cowling 14 and the engine slider 15 to a main frame 45. The head portion 28a is a support element which is exposed outside through the opening of the recess S7 and supports the cowling 14 and the engine slider 15. The shaft portion 28b is a connection element connected to the threading element 43 in the inner space of the recess S7.

The threading element 43 is an intermediate section which is accommodated in the recess S7 and removably fastened to the main frame 45. The threading element 43 includes a body 43a accommodated in the recess S7 of the tubular section 44, and a flange 43b which contacts an end surface 44a at the opening of the tubular section 44 and covers the opening of the tubular section 44. A threaded hole 43c is funned in a region in the vicinity of the center of the body 43a The shaft portion 28b is threadingly engaged with the threaded hole 43c. In this structure, the threading element 43 also serves as a threading element for the shaft portion 28b. A male thread 43d is formed in the outer periphery of the body 43a.

The tubular section 44 is provided on the main frame 45. The recess S7 defined by the tubular section 44 is recessed in a direction indicated by L3, namely the direction in which the threading element 43 is inserted into the recess S7, A female thread 44b is formed on the inner peripheral surface of the recess S7 and is threadingly engageable with the male thread 43d. In the recess S7, the driving unit 3 is fastened to the main frame 45 in such a manner that the shaft portion 35a of the driving unit mounting bolt 35 is threadingly engaged with a bolt hole 40d formed in a bottom portion 40c of the tubular section 44.

Now, how to mount the cowling 14 and the engine slider 15 to the main frame 45 in the recess S7 by use of the third mounting unit 42 having the above configuration, will be described. Initially, the male thread 43d of the body 43a of the threading element 43 is threadingly engaged with the female thread 44b of the tubular section 44. At this time, the flange 43b contacts the end surface 44a of the tubular section 44, and thereby the displacement of the threading element 43 in the direction L3 is restricted. In this way, the threading element 43 can be positioned properly with respect to the tubular section 44, accommodated in the recess S7, and removably fastened to the main frame 45.

In this state, as in the above-described embodiment, the shaft portion 28b of the first adjacent member component mounting bolt 28 is inserted into the bolt hole 15a of the engine slider 15, the bolt hole 29a of the metal washer 29, the opening 30a of the rubber washer 30, the bolt hole 14a of the cowling 14 and the bolt hole 31c of the bush 31, in this order. At this time, the collar 31b of the bush 31 is inserted into the bolt hole 14a of the cowling 14 and the opening 30a of the rubber washer 30. Then, the shaft portion 28b is threadingly engaged with the threaded hole 43c of the threading element 43. As the threading engagement between the shaft portion 28b and the threading element 43 progresses, the shaft portion 28b is connected to the threading element 43. In this way, the cowling 14 and the engine slider 15 are mounted to the main frame 45 via the third mounting unit 42.

Through the above-described procedure, the third mounting unit 42 is firmly fastened to the main frame 45 in the recess S7 of the tubular section 44. By use of the third mounting unit 42 and the recess S7, a structural limitation on mounting of the cowling, 14 and the engine slider 15 to the main frame 45 can be lessened. Since it is not necessary to form on the main frame 45 a member such as a bracket or a welding nut used to mount the cowling 14 or the engine slider 15 to the main frame 45, the structure of the frame assembly 2 can be simplified. Therefore, it becomes possible to realize the component mounting structure of the vehicle which allows the vehicle body to be designed more flexibly.

Furthermore, in Modified Example 2, by the threading engagement between the shaft portion 28b and the threaded hole 43c of the threading element 43, the threading element 43 can be firmly fastened to the tubular section 44. As a result, the cowling 14 and the engine slider 15 can be surely and stably mounted to the main frame 45 via the third mounting unit 42.

<Others>

The present invention is not limited to the configurations of the above-described embodiment and the configurations of the above-described modified examples. The configurations may be changed, added to, or deleted from within a scope of the invention.

The frame assembly may not include the main frame. The recesses used to fasten the mounting members and the intermediate sections may be provided in any location of the frame assembly. For example, in a case where the frame assembly includes a rear frame, the rear frame may be provided with the recesses.

The support element and the connection element of the mounting member may be separate members. For example, the support element may be a nut and the connection element may be a threaded shaft which is threadingly engageable with the nut.

In the vehicle of the above-described embodiment and the vehicles of the above-described modified examples, only one of the first mounting unit 26, the second mounting units 27, 40, and the third mounting unit 42, may be used, or two or more of them may be used together.

In the vehicle of the above-described embodiment and the vehicles of the above-described modified examples, each of the first mounting unit 26, the second mounting units 27, 40, and the third mounting unit 42 may be used to mount two or more first adjacent components to the main frame 2b via one recess, or to mount only one first adjacent component via one recess.

In the recess S1 of the above-described embodiment, the driving unit 3 need not be fastened to the main frame 2b. Further, in the recess S7 of Modified Example 2, the driving unit 3 need not be fastened to the main frame 45.

In the above-described embodiment and the above-described modified examples, the driving unit mounting bolt 35 and the radiator mounting bolt 39 need not be the fastening members used to fasten the driving unit 3 and the radiator 17 to the main frame 2b, and may be bolts fastened to the main frame 2b.

In the above-described embodiment, the direction in which the shaft portion 39c is threadingly engaged with the driving unit 3 may be the same as the direction in which the shaft portion 36b is threadingly engaged with the female thread 39b.

The first adjacent components are not limited to the external components such as the cowling 14 and the engine slider 15. For example, the first adjacent components may be other components adjacent to the frame assembly 2, for example, an engine guard, or stays. Further, the first adjacent components may be members other than the external components, for example, cases, brackets used to mount the cases to the frame assembly 2, etc. Further, the second adjacent components are not limited to the driving unit 3 and the radiator 17, and may be components adjacent to the frame assembly 2, such as the exhaust device 16, or the air cleaner. The first adjacent component and the second adjacent component may be components of the sane kind.

In the first tubular section 18, the fastening element 33 and the threading, element 34 may be aligned so that the region of the inner peripheral surface of the recess S1 which the fastening element 33 or the threading element 34 pressingly contacts when the shaft portion 28*b* is threaded into the threaded hole 34*a* is closer to a location at which the first tubular section 18 and the second frame member 2*f* are coupled to each other, or a location at which the first tubular section 18 and the coupling frame member 2*k* are coupled to each other. This is desirable, because the fastening element 33 or the threading element 34 can stably pressingly contact the region of the inner peripheral surface of the recess S1 which has a relatively high stiffness. In this case, the outer peripheral portion 18*a* of the first tubular section 18 may be provided with a marker for positioning the fastening element 33 and the threading element 34 in the circumferential direction of the outer peripheral portion 18*a* The marker may be a seal or label bonded to the main frame 2*b*, or may be an engraved marker formed on the main frame 2*b*.

In the above-described embodiment, the bolt bole 33*e* of the fastening element 33 may be partially opened in the outer periphery of the fastening element 33. In other words, the fastening element 33 may be configured such that a portion of the peripheral edge of the bolt hole 33*e* is in communication with the outer periphery of the fastening element 33 when viewed from above. In this configuration, even after the shaft portion 28*b* is temporarily engaged with the threading element 34, the fastening element 33 can be placed on the shaft portion 28*b*. This makes it possible to easily carry out the operation for mounting the cowling 14 and the engine slider 15 to the main frame 2*b*.

In the above-described embodiment, the shape of the threaded groove 36*c* is not limited to the shape of the hexagonal wrench. For example, without forming the threaded groove 36*c*, the head portion 36*a* may have a polygonal shape such as a hexagon, as in the head portion 28*a*. In this configuration, the first adjacent component mounting bolt 28 may be tightened by use of a wrench or the like.

In the above-described embodiment and the above-described modified examples, the shape of the peripheral edge of the end surface of the tubular section to which each mounting unit is mounted is not limited to a circle shape, and may be, for example, a rectangle, a polygon, an oval, or an elongated hole.

The method of forming the tubular section on the frame assembly such as the vehicle body frame is not particularly limited. For example, the tubular section may be formed by cutting, or formed concurrently with the formation of the frame assembly.

The recess defined by the tubular section ma have a function other than the function for mounting the first adjacent component to the frame assembly. For example, the recess may be intended to couple another frame member such as the rear frame to the main frame. Further, the bottom portion or side surface of the tubular section may be formed with a hole to guide a tool to the interior of the frame assembly, and thus the recess may serve to guide the tool. Further, the bottom portion or side surface of the tubular section may be formed with a hole through which a device disposed in an inner space surrounded by the frame assembly can be seen from outside the frame assembly, and thus the recess may serve as an aperture through which the device can be seen. Such a recess can be used to removably fasten the above-described intermediate section to the frame assembly. The tubular section defining the recess may serve as a fastening section for fastening a pipe-shaped member or another member to the main frame.

In the tubular section to which the above-described mounting unit is mounted, the recess may be recessed in, for example, a vertical direction or a forward and rearward direction, which is other than the vehicle width direction. Therefore, by use of any one of the above mounting units, the first adjacent component including the external component or the like can be mounted to the frame assembly, in the vertical direction or in the forward and rearward direction.

In the above-described embodiment, the driving unit 3 is not limited to the unit including only the engine 3*a* as a driving source for moving the vehicle body, and may include at least one of the engine 3*a* and an electric motor for moving the vehicle body. In other words, the straddle-type vehicle 1 may be configured as a hybrid vehicle or an electric vehicle.

The above embodiment may be applicable to vehicles other than the straddle-type vehicle, for example, an automobile, a three-wheeled vehicle, or a personal watercraft (PWC).

As should be appreciated from the above, the component mounting structure of the vehicle of the present invention which allows a vehicle body to be designed more flexibly, and is widely applicable to vehicles which can achieve this advantage.

Numerous improvements and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

What is claimed is:

1. A component mounting structure of a vehicle comprising:
    a frame assembly having a recess which is recessed in a predetermined direction;
    an intermediate section accommodated in the recess and removably fastened to the frame assembly; and
    a mounting member used to mount a first adjacent component adjacent to the frame assembly to the frame assembly,
    wherein the mounting member includes a connection element connected to the intermediate section in an inner space of the recess and a support element which is continuous with the connection element and supports the first adjacent component in a state in which the connection element is exposed outside through an opening of the recess,
    wherein the connection element has a threaded portion placed in the recess,
    wherein the intermediate section includes a fastening element which pressingly contacts an inner peripheral surface of the recess and a threading element threadingly engaged with the threaded portion, and
    wherein the fastening element and the threading element have surfaces facing each other that are spaced apart from each other in an axial direction of the threaded portion, and inclined surfaces which extend from the surfaces facing each other are located radially outward of the threaded portion, are inclined with respect to a radial direction of the threaded portion, and are in surface contact with each other.

2. The component mounting structure of the vehicle according to claim 1,
wherein the connection element is connected to the intermediate section such that the connection element is threadingly engageable with the intermediate section and is disengageable from the intermediate section.

3. The component mounting structure of the vehicle according to claim 1,
wherein the frame assembly includes two or more elongated sections and a coupling section for coupling outer peripheral portions of the elongated sections which are adjacent to each other, and
wherein the inner space of the recess is an inner space of the coupling section.

4. The component mounting structure of the vehicle according to claim 3,
wherein the coupling section is placed such that an axis of the coupling section extends in a direction perpendicular to a lengthwise direction of one of the elongated sections.

5. The component mounting structure of the vehicle according to claim 1,
wherein the recess is formed with a bolt hole, and
wherein a second adjacent component adjacent to the frame assembly is fastened to the frame assembly by use of a fastening member placed via the bolt hole.

6. The component mounting structure of the vehicle according to claim 1,
wherein the recess has a function other than a function for mounting the first adjacent component to the frame assembly.

7. The component mounting structure of the vehicle according to claim 1,
wherein the intermediate section is removably mounted to the frame assembly in such a manner that the intermediate section pressingly contacts the inner peripheral surface of the recess or is moved away from the inner peripheral surface of the recess.

8. The component mounting structure of the vehicle according to claim 7,
wherein the intermediate section includes a restricting section which contacts an end surface at the opening of the recess to restrict a displacement of the intermediate section in the predetermined direction.

9. The component mounting structure of the vehicle according to claim 1,
wherein the fastening element is retained between the support element and the threading element, and pressingly contacts the inner peripheral surface of the recess as a threading engagement between the threaded portion and the threading element progresses.

* * * * *